United States Patent
Sato et al.

(10) Patent No.: US 11,102,374 B2
(45) Date of Patent: *Aug. 24, 2021

(54) INFORMATION PROCESSING TERMINAL TRANSMITTING COMMAND INSTRUCTING EXECUTION OF IMAGE PROCESSING OPERATION TO SPECIFIED APPARATUS AND NON-TRANSITORY COMPUTER-READABLE RECORDING MEDIUM STORING PROGRAM FOR THE INFORMATION PROCESSING TERMINAL

(71) Applicant: BROTHER KOGYO KABUSHIKI KAISHA, Aichi (JP)

(72) Inventors: Hirokazu Sato, Nagoya (JP); Tatsuhiko Sone, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,324

(22) Filed: Mar. 30, 2020

(65) Prior Publication Data

US 2020/0228676 A1 Jul. 16, 2020

Related U.S. Application Data

(63) Continuation of application No. 16/211,329, filed on Dec. 6, 2018, now Pat. No. 10,616,440.

(30) Foreign Application Priority Data

Dec. 7, 2017 (JP) .............................. JP2017-234925

(51) Int. Cl.
*H04N 1/327* (2006.01)
*H04N 1/00* (2006.01)
*H04N 1/32* (2006.01)

(52) U.S. Cl.
CPC ..... *H04N 1/32776* (2013.01); *H04N 1/00129* (2013.01); *H04N 1/00474* (2013.01);
(Continued)

(58) Field of Classification Search
None
See application file for complete search history.

(56) References Cited

U.S. PATENT DOCUMENTS

| 2012/0229854 A1* | 9/2012 | Maeshima ............. G11B 23/40 |
| | | 358/1.15 |
| 2013/0104052 A1 | 4/2013 | Chang et al. |
| 2017/0153780 A1‡ | 6/2017 | Asai ...................... G06F 3/0482 |

FOREIGN PATENT DOCUMENTS

| JP | 2017-054334 A | ‡ | 3/2017 |
| JP | 2017-054334 A | | 3/2017 |

(Continued)

OTHER PUBLICATIONS

Notice of Allowance dated Nov. 25, 2019 received in U.S. Appl. No. 16/211,329.

(Continued)

*Primary Examiner* — Lennin R Rodriguez Gonzalez
(74) *Attorney, Agent, or Firm* — Scully Scott Murphy and Presser

(57) ABSTRACT

In an information processing terminal, a processor receiving identification information from another program. The identification information is for identifying an image processing operation. The processor performs a first determination process determining whether the specified apparatus is capable of executing the image processing operation identified by the identification information. The processor performs a first display process displaying determination information indicating a result of the first determination process. The processor receives operation condition information from the external program in a case where the first deter- (Continued)

mination process determines that the specified apparatus is capable of executing the image processing operation. The operation condition information indicates a condition for executing the image processing operation. The processor transmits a command to the specified apparatus. The command instructs execution of the image processing operation under the operation condition information.

7 Claims, 12 Drawing Sheets

(52) U.S. Cl.
CPC . *H04N 1/32539* (2013.01); *H04N 2201/0075* (2013.01); *H04N 2201/0094* (2013.01)

(56) References Cited

FOREIGN PATENT DOCUMENTS

| | | | |
|---|---|---|---|
| JP | 2017-097751 A | ‡ | 6/2017 |
| JP | 2017-097751 A | | 6/2017 |

OTHER PUBLICATIONS

Office Action dated Jun. 28, 2019 received in U.S. Appl. No. 16/211,329.

\* cited by examiner
‡ imported from a related application

FIG. 3

| OPERATION ID | OPERATION INFORMATION |
|---|---|
| DISC LABEL PRINT | BASIC OPERATION |
| DISC LABEL SCAN | OPTIONAL OPERATION |

| DEVICE ID | MFP-AABB |
|---|---|
| CAPABILITY INFORMATION | DISC LABEL PRINT |
| | DISC LABEL SCAN |

FIG. 4B d2(d)

| DEVICE ID | MFP-BBCC |
|---|---|
| CAPABILITY INFORMATION | DISC LABEL PRINT |
| | |

FIG. 4C d3(d)

| DEVICE ID | MFP-CCDD |
|---|---|
| CAPABILITY INFORMATION | |
| | DISC LABEL SCAN |

INFORMATION PROCESSING TERMINAL TRANSMITTING COMMAND INSTRUCTING EXECUTION OF IMAGE PROCESSING OPERATION TO SPECIFIED APPARATUS AND NON-TRANSITORY COMPUTER-READABLE RECORDING MEDIUM STORING PROGRAM FOR THE INFORMATION PROCESSING TERMINAL

CROSS REFERENCE TO RELATED APPLICATION

This application is a continuation application of U.S. application Ser. No. 16/211,329 filed on Dec. 6, 2018, which claims benefit of Japanese Patent Application No. 2017-234925 filed Dec. 7, 2017. The entire content of the priority application is incorporated herein by reference.

TECHNICAL FIELD

The present disclosure relates to a program executed by an information processing terminal when the information processing terminal instructs an image processing apparatus to execute an image processing operation, and relates to the information processing terminal that executes the program.

BACKGROUND

There is a known program for an information processing terminal which allows a user to designate image data and allows an image processing apparatus to execute an image processing operation on the image data. For example, a program disclosed in Japanese Patent Application Publication No. 2017-097751 allows a user to designate image data stored in a portable terminal. The program then allows a multifunction peripheral to execute a print operation, in which an image represented by the image data is printed on a paper.

The portable terminal disclosed in Japanese Patent Application Publication No. 2017-097751 has first and second programs installed therein. That is, the first program allows an image processing apparatus to execute an operation on image data and the second program allows a user to specify the operation. More specifically, when the user starts the second program, the started second program allows the user to specify or designate image data and an operation to be executed on the image data, and starts the first program by providing designation information to the first program. Here, the specification information includes information to identify the specified image data (hereinafter referred to as specified data), and information to identify the operation (hereinafter referred to as specified operation) for the specified data. The started first program allows the user to designate an image processing apparatus capable of executing the specified operation identified by the specification information provided by the second program. The first program sends to the image processing apparatus information instructing the image processing apparatus to execute the specified operation on the specified data so as to allow the image processing apparatus to execute the specified operation on the specified data.

SUMMARY

In the above described technique, however, when the image processing apparatus, which can execute the operation specified by the second program, is not connected with the portable terminal, the user cannot instruct the image processing apparatus to execute the operation. As a result, the user operation for designating the image processing operation via the second program becomes useless.

In order to overcome the above problems, the disclosure provides a non-transitory computer-readable recording medium storing a first program for an information processing terminal having: a processor, and a memory storing capability information of a specified apparatus; a display; and a communication interface. The information processing terminal has an operating system and a second program installed therein. The specified apparatus is an image processing apparatus specified by a user. The operating system includes a share function to transmit and receive data between the first program and the second program. The information processing terminal executing the second program instructs execution of an image processing operation, the first program comprising instructions for: receiving identification information from the second program via the share function, the identification information being for identifying an image processing operation among image processing operations, the second program being capable of instructing each of the image processing operations to the specified apparatus via the first program; performing a first determination process determining by using the capability information stored in the memory whether the specified apparatus is capable of executing the image processing operation identified by the identification information; performing a first display process displaying on the display determination information indicating a result of the first determination process; receiving operation condition information via the share function from the second program in a case where the first determination process determines that the specified apparatus is capable of executing the image processing operation identified by the identification information, the operation condition information indicating a condition for executing the image processing operation identified by the identification information, the operation condition information received from the second program being transmitted by specifying the image processing operation by the user in the second program; and transmitting a command to the specified apparatus via the communication interface, the command instructing execution of the image processing operation under the condition indicated by the operation condition information.

According to another aspect, the disclosure provides an information processing terminal. The information processing terminal includes a processor, an operation interface, and a memory. The memory stores capability information of a specified apparatus, the specified apparatus being an image processing apparatus specified by a user. A first program, a second program, and an operating system are installed in the information processing terminal. The operating system includes a share function to transmit and receive data between the first program and the second program, wherein the information processing terminal executing the second program instructs execution of an image processing operation. The first program, when executed by the processor, causes the processor to perform: receiving identification information from the second program via the share function, the identification information being for identifying an image processing operation among image processing operations, the second program being capable of instructing each of the image processing operations to the specified apparatus via the first program; performing a first determination process determining by using the capability information stored in the memory whether the specified apparatus is capable of executing the image processing operation identified by the identification information; performing a first display process displaying on the display determination information indicating a result of the first determination process; receiving operation condition information via the share function from the second program in a case where the first determination process determines that the specified apparatus is capable of executing the image processing operation identified by the identification information, the operation condition information indicating a condition for executing the image processing operation identified by the identification information, the operation condition information received from the second program being transmitted by specifying the image processing operation by the user in the second program; and transmitting a command to the specified apparatus via the communication interface, the command instructing execution of the image processing operation under the condition indicated by the operation condition information.

According to still another aspect, the disclosure provides a non-transitory computer-readable recording medium storing a first program and a second program for an information processing terminal having: a processor, and a memory storing capability information of an image processing apparatus; a display; and a communication interface. The information processing terminal has an operating system installed therein. The operating system includes a share function to transmit and receive data between the first program and the second program. The second program includes instructions for: transmitting identification information to the first program via the operating system, the identification information being for identifying an image processing operation among image processing operations, the second program being capable of instructing each of the image processing operations to the image processing apparatus via the first program; receiving an operation condition for the information processing operation identified by the identification information via the operation interface in a case where determination information is received from the first program via the operating system, the determination information indicating that the image processing apparatus is capable of executing the image processing operation identified by the identification information; and transmitting operation condition information to the first program via the operating system, the operation condition information indicating an operation condition for the image processing operation. The first program includes instructions for: receiving the identification information from the second program via the operating system; performing a determination process determining by using the capability information stored in the memory whether the image processing apparatus is capable of executing the image processing operation identified by the identification information; in a case where the image processing apparatus is determined to be capable of executing the image processing operation identified by the identification, transmitting the determination information to the second program via the operating system; as a response to the determination information, receiving the operation condition information from the second program via the operating system; and transmitting a command to the image processing apparatus via the communication interface, the command instructing execution of the image processing operation under the condition indicated by the operation condition information.

BRIEF DESCRIPTION OF THE DRAWINGS

The particular features and advantages of the disclosure as well as other objects will become apparent from the following description taken in connection with the accompanying drawings, in which:

FIG. 3 is a table illustrating an operation list stored in a memory of the information processing terminal;

FIG. 4A-4C are tables illustrating device information stored in respective memories of multifunction peripherals;

DETAILED DESCRIPTION

Hereinafter, an embodiment of the present disclosure will be described with reference to the accompanying drawings. Here, the below-described embodiment is merely one example of the embodiments of the present disclosure, and may be modified appropriately without departing from the scope of the present invention. For example, an order of processes described below may be changed appropriately without changing the scope of the present invention.

System 100

Figure 1:
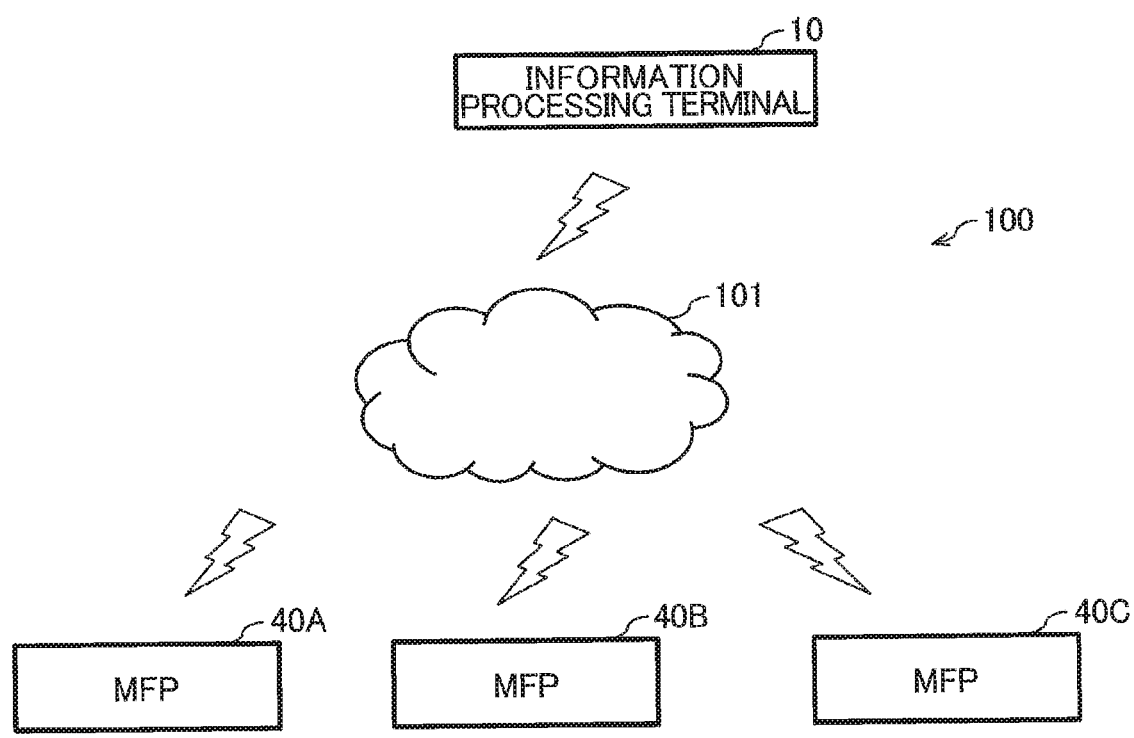
FIG. 1 is a schematic diagram illustrating a system according to an embodiment.

FIG. 1 is a schematic diagram illustrating a system 100 according to the present embodiment. The system 100 includes an information processing terminal 10, and multifunction peripherals (MFPs) 40A, 40B, and 40C. The MFP 40 and the information processing terminal 10 are configured to communicate with each other via a communication network 101. The communication network 101 may be the Internet, a wired LAN, a wireless LAN, or any combination thereof. Alternatively, the MFP 40 and the information processing terminal 10 may be connected with each other via a USB cable.

Configuration of MFP 40

Figure 2A:
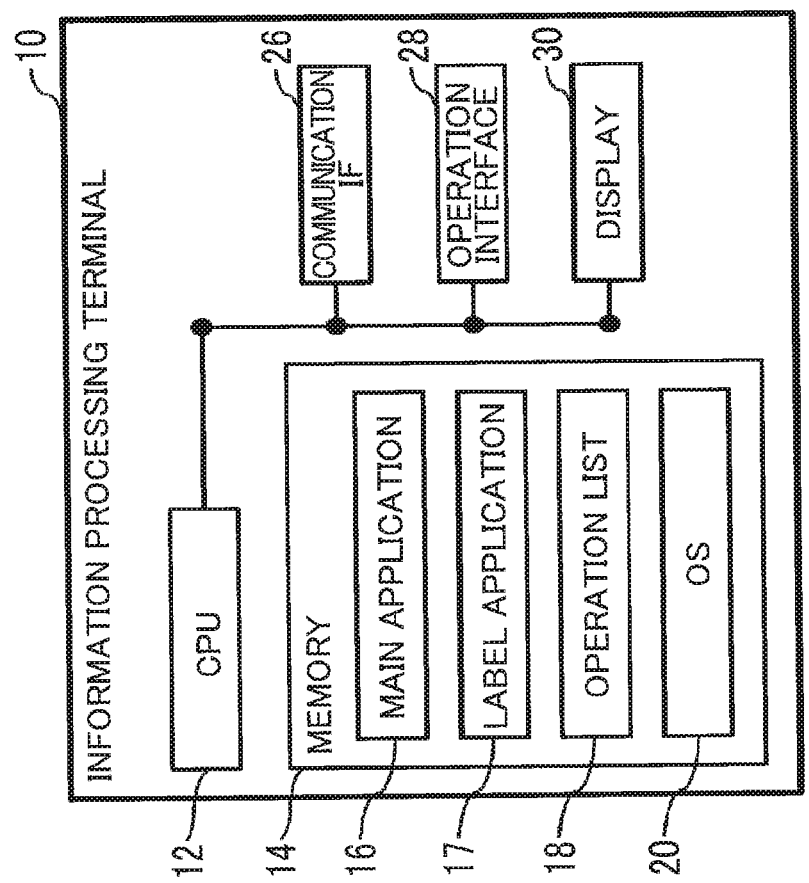
FIG. 2A is a block diagram illustrating an information processing terminal according to the embodiment.
Figure 2B:
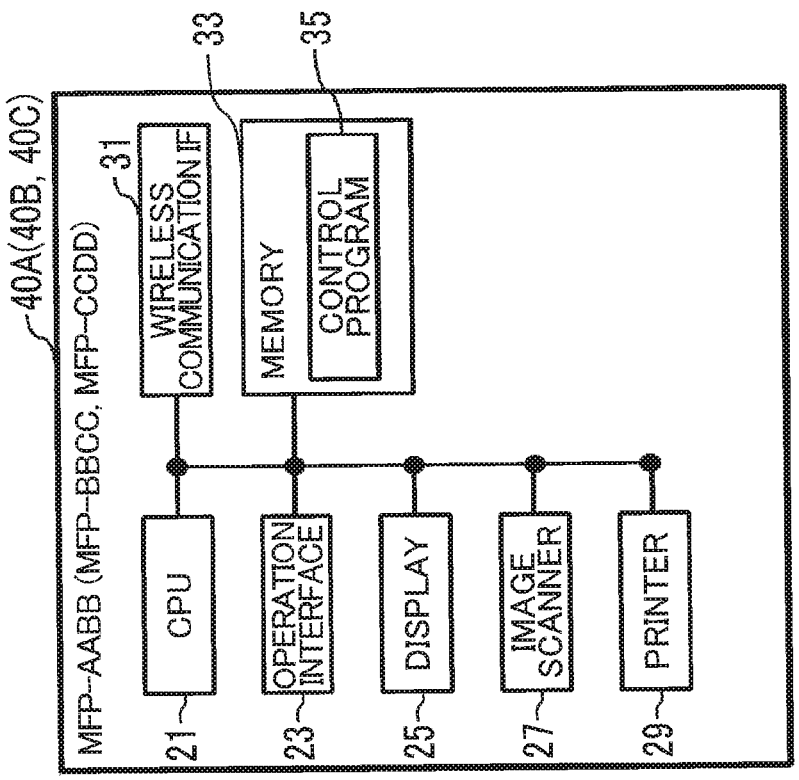
FIG. 2B is a block diagram illustrating a multifunction peripheral according to the embodiment.
Figure 5:
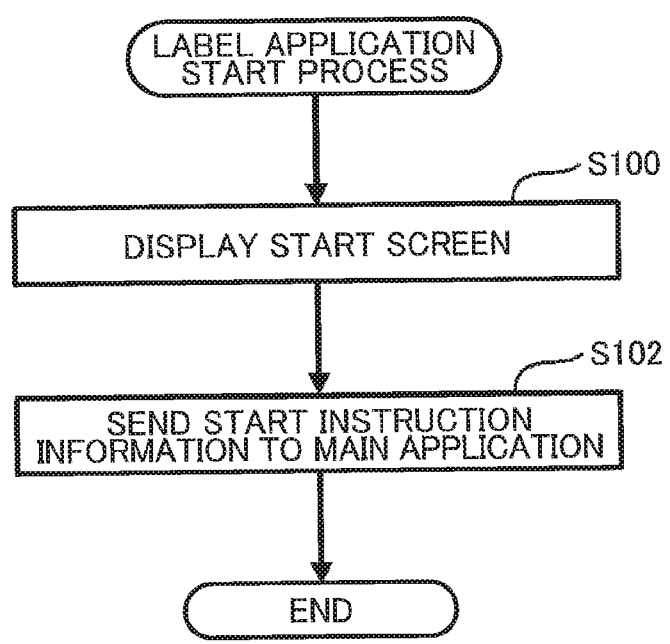
FIG. 5 is a flowchart illustrating a start process according to the embodiment.

As illustrated in FIG. 2B, the MFP 40 mainly includes a CPU 21, an operation interface 23, a display 25, an image scanner 27, a printer 29, a wireless communication interface (wireless communication IF) 31, and a memory 33. These components of the MFP 40 are connected with each other. In this description, the term "interface" is abbreviated as "IF". Here, since the MFP 40B and the MFP 40C have the same configuration as that of the MFP 40A, the description thereof will be omitted herein.

The CPU 21 controls the MFP 40 according to a control program 35 stored in the memory 33, various pieces of information sent from the operation interface 23, and various pieces of information sent from a communication apparatus via the wireless communication IF 31.

The operation interface 23 includes a plurality of operation buttons operated by a user. The operation interface 23 generates a signal when a user presses a button, and sends the signal to the CPU 21. The user gives a desired instruction to the CPU 21 by operating the operation interface 23. The operation interface 23 may be integrated with the display 25, and constitute a touch panel. The display 25 may include an LCD. The display 25 displays various pieces of information on the display, according to instructions from the CPU 21.

The image scanner 27 is hardware to execute a scan operation. The scan operation is an operation to read an image of a document and create corresponding image data. The printer 29 is hardware to execute a print operation. The print operation is an operation to print an image represented by image data on a recording sheet. Although the printer 29 of the present embodiment is an ink-jet printer which ejects ink to print images, the printer 29 may be an electrophotographic printer. The print operation and the scan operation are image processing operations described later.

The wireless communication IF 31 is an interface which can communicate with an external apparatus via the communication network 101. The communication method of the wireless communication IF 31 is not limited to a particular method. The wireless communication IF 31 may use a wireless communication system, as the communication method according to the Wi-Fi system standardized by the Wi-Fi Alliance. If the MFP 40A and the information processing terminal 10 are connected with each other via a USB cable, the wireless communication IF 31 may be the USB interface to which the USB cable can be detachably attached.

The memory 33 may be a flash memory, and stores the control program 35. The control program 35 may be stored in the memory 33 before shipment, or may be stored from a medium such as a CD-ROM.

A management information base (MIB) of the memory 33 in the MFP 40A stores device information d1 (FIG. 4A). The MIB of the memory 33 in the MFP 40B stores device information d2 (FIG. 4B). The MIB of the memory 33 in the MFP 40C stores device information d3 (FIG. 4C). Hereinafter, the device information d1, d2, and d3 may be collectively called device information d. The device information d includes a device ID used to identify the MFP 40, and capability information of the MFP 40. The capability information indicates performance of the MFP 40. Specifically, the capability information indicates details of the print operation and the scan operation which the MFP 40 can execute. The capability information includes sheet sizes in which the printing can be executed, sheet types, information about whether color/monochrome printing can be executed, whether duplex printing can be executed, printing resolution, information about whether borderless printing can be executed, reading resolution, and information about whether color/monochrome reading can be executed. The device ID may have any format, such as text or binary format, as long as the MFPs 40A, 40B, and 40C can be uniquely identified on the communication network 101.

As described in detail later, the capability information of the device information d indicates whether the MFP 40 can execute a disc label print operation and/or a disc label scan operation. The disc label print operation is a print operation to print an image on the surface of a disc label (e.g. a disc label on a CD-ROM or a DVD-ROM). The disc label scan operation is a scan operation to read a document, and correct the color of the document into another color (disc label quality color), to create scan data. Here, the image is to be printed on the surface of a disc by using the scan data. The disc label print operation and the disc label scan operation are image processing operations described later.

The capability information in the device information d1 of the MFP 40A indicates that the MFP 40A can execute the disc label print operation and the disc label scan operation. Specifically, if the capability information indicates that the MFP 40 can execute the disc label print operation, the capability information includes information to indicate that the MFP 40 supports the print operation, and information to indicate that the MFP 40 supports the sheet size of a disc label. If the capability information indicates that the MFP 40 can execute the disc label print operation, the capability information includes information to indicate that the MFP 40 supports the scan operation, and information to indicate that the MFP 40 supports a color used for the disc label copy. The capability information in the device information d2 of the MFP 40B indicates that the MFP 40B can execute the disc label print operation but cannot execute the disc label scan operation. The capability information in the device information d3 of the MFP 40C indicates that the MFP 40C can execute the disc label scan operation but cannot execute the disc label print operation.

The device ID in the device information d1 of the MFP 40A indicates "MFP-AABB". The device ID in the device information d2 of the MFP 40B indicates "MFP-BBCC". The device ID in the device information d3 of the MFP 40C indicates "MFP-CCDD".

Configuration of Information Processing Terminal 10

The information processing terminal 10 may be a portable phone, a smartphone, or a tablet terminal. As illustrated in FIG. 2A, the information processing terminal 10 includes a CPU 12, a memory 14, a communication IF 26, an operation interface 28, and a display 30. These components of the information processing terminal 10 are connected with each other. The configuration of the communication IF 26 is the same as that of the previously-described communication IF 31, and thus the description thereof will be omitted herein.

The CPU 12 controls each function, according to a main application 16, a label application 17, an operating system 20 (hereinafter referred to as an OS 20), and various signals transmitted or received via interfaces, such as the communication IF 31 and the communication IF 26.

For example, the memory 14 may be a RAM, a ROM, a flash memory, or an HDD. The memory 14 stores the main application 16, the label application 17, an operation list 18, and the OS 20.

In addition, the memory 14 also stores manifest files (not illustrated) associated with the main application 16 and the label application 17. The manifest files are stored in the memory 14 when the applications are installed in the information processing terminal 10. Each of the manifest files includes a package name and activity information. The package name is used to identify an application supporting each manifest file. The activity information defines screens displayed by a corresponding application. The activity information may define startup conditions and motions of the screens.

The main application 16 and the label application 17 may be installed to the information processing terminal 10 from an application store server (not shown) located on the communication network 101, or may be installed to the information processing terminal 10 via a medium which is shipped together with the MFP 40.

The main application 16 is a program which allows the MFP 40 to execute an image processing operation via the communication IF 26. Target print data for the image processing operation and parameters corresponding to a plurality of conditions for the image processing operation may be specified by the main application 16 allowing a user to select them via the operation interface 28, or by another program installed in the information processing terminal 10, such as the label application 17. Here, the main application 16 differs from device drivers which receive target print data for image processing operation from another program, and which causes a user to select parameters corresponding to a plurality of conditions for the image processing operations.

The label application 17 has a disc label print function and a disc label copy function. The disc label print function creates disc label image data in accordance with a user operation executed via the operation interface 28, and instructs the MFP 40 via the main application 16 to execute the disc label print operation based on the created disc label image data. The disc label copy function acquires scan data created through the disc label scan operation from the MFP 40 via the main application 16, creates disc label image data representing an image to be printed on a disc by using the acquired scan data, and instructs the MFP 40 via the main application 16 to execute the disc label print operation using the created disc label image data. That is, an MFP 40 capable of executing the disc label print operation is necessary for the disc label print function. An MFP 40 capable of executing both the disc label print operation and the disc label scan operation is necessary for the disc label copy function.

The operation list 18 is stored in the memory 14 when the label application 17 is installed to the information processing terminal 10. As illustrated in FIG. 3, the operation list 18 includes operation IDs and operation information. Each operation ID is for identifying an image processing operation. Here, the label application 17 can instruct a specified apparatus via the main application 16 to execute the image processing operation. An operation ID "disc label print" may indicate the disc label print operation, and an operation ID "disc label scan" may indicate the disc label scan operation. The operation information indicates that an image processing operation indicated by a corresponding operation ID is either a basic operation or an optional operation. The basic operation is an image processing operation required by all functions (the disc label print function and the disc label copy function in this example) of the label application 17. The optional operation is an image processing operation required by one of functions of the label application 17 except the basic operation. In the present embodiment, for the label application 17, the disc label print operation is the basic operation, and the disc label scan operation is the optional operation.

The OS 20 may be Android (registered trademark) OS. The OS 20 is a program having functions to control the display 30 to display various images, and having basic functions used by application programs. In addition, the OS 20 is also a program to provide application programming interfaces (APIs) used for application programs to send instructions to various pieces of hardware. The OS 20 can execute, in parallel, a plurality of programs installed in the information processing terminal 10. The OS 20 executes one program in the foreground among the plurality of programs executed in parallel, and executes the other programs in the background. The information processing terminal 10 controls the display 30 to display only a screen produced by the program executed in the foreground among the plurality of programs executed in parallel.

The operation interface 28 includes keys to execute various functions of the information processing terminal 10. The operation interface 28 sends to the CPU 12 a signal generated in accordance with a user operation. A user may input a desired instruction to the CPU 12 by operating the operation interface 28. The operation interface 28 may be integrated with the display 30, and constitute a touch panel.

The display 30 displays various pieces of information of the information processing terminal 10. The display 30 displays various pieces of information according to instructions from the CPU 12.

The label application 17 may start the main application 16 as a plug-in. Similarly, the main application 16 may start the label application 17 as a plug-in. The label application 17 is an example of an external program. The external program is different from a program which starts the external program, and can be executed independently. That is, the external program is different from subroutines of the program which starts the external program. In addition, the information processing terminal 10 executes both the external program and the program starting the external program.

The main application 16 and the label application 17 may send/receive information to/from each other via a share function of the OS 20. More specifically, a sending application for sending data executes an Intent API provided by the OS 20 while specifying a URI scheme as an argument. Here, the URI scheme includes a package name, activity information, and the data. The package name is for identifying a receiving application which receives the data. The activity information indicates an activity executed by the receiving application. With this operation, the sending application can send data to the receiving application.

Note on Description

Hereinafter, the phrases such as "the CPU 12 performs . . . " and the phrases such as "the main application 16 performs . . . " may indicate "the CPU 12 executing the main application 16 in the information processing terminal 10 performs . . . ". In addition, the phrases such as " . . . accepts, via the operation interface 28, a user operation to select an icon, a button, or the like" may indicate " . . . accepts, via the operation interface 28, a user operation executed at the position of an icon, a button, or the like displayed on the display 30".

System Operation

Next, with reference to FIGS. 5 to 11, procedures of the system 100 of the present embodiment will be described. Here, the following operation is executed in a case where a desired MFP 40 has been selected by a user from among a plurality of MFPs 40 with which the information processing terminal 10 can communicate via the communication IF 26 by executing the main application 16 (hereinafter, the MFP 40 having been selected by a user is referred to as a specified apparatus). Thus, the memory 14 stores device information d on the specified apparatus as specified device information d. Further, the memory 14 stores a no-device flag set to a first value "OFF" at this stage.

Start Process

When the CPU 12 executing the OS 20 receives an instruction to start the label application 17 from a user via the operation interface 28, the CPU 12 starts the label application 17. The CPU 12 then executes a start process illustrated in FIG. 5, by executing the label application 17.

In S100, the CPU 12 controls the display 30 to display a start screen (not illustrated). The start screen may include a message, such as "checking support for label application".

In S102, the CPU 12 sends start instruction information to the main application 16 via a share function of the OS 20, and thereby starts the main application 16. More specifically, the label application 17 executes an Intent API provided by the OS while specifying a URI scheme as an argument. Here, the URI scheme includes a package name, activity information, and the start instruction information. The package name is for identifying the main application 16. The activity information instructs the main application 16 to execute a determination-result display process shown in FIG. 6. The start instruction information includes the operation list 18.

Determination-Result Display Process

After S102, the CPU 12 executing the OS 20 starts the main application 16 identified by the package name in the start instruction information (or the URI scheme), to execute the main application 16 in the foreground. The CPU 12 executes the determination-result display process (FIG. 6) indicated by the activity information in the start instruction information (or the URI scheme), by executing the main application 16. From this time, the label application 17 is executed in the background.

Figure 6:
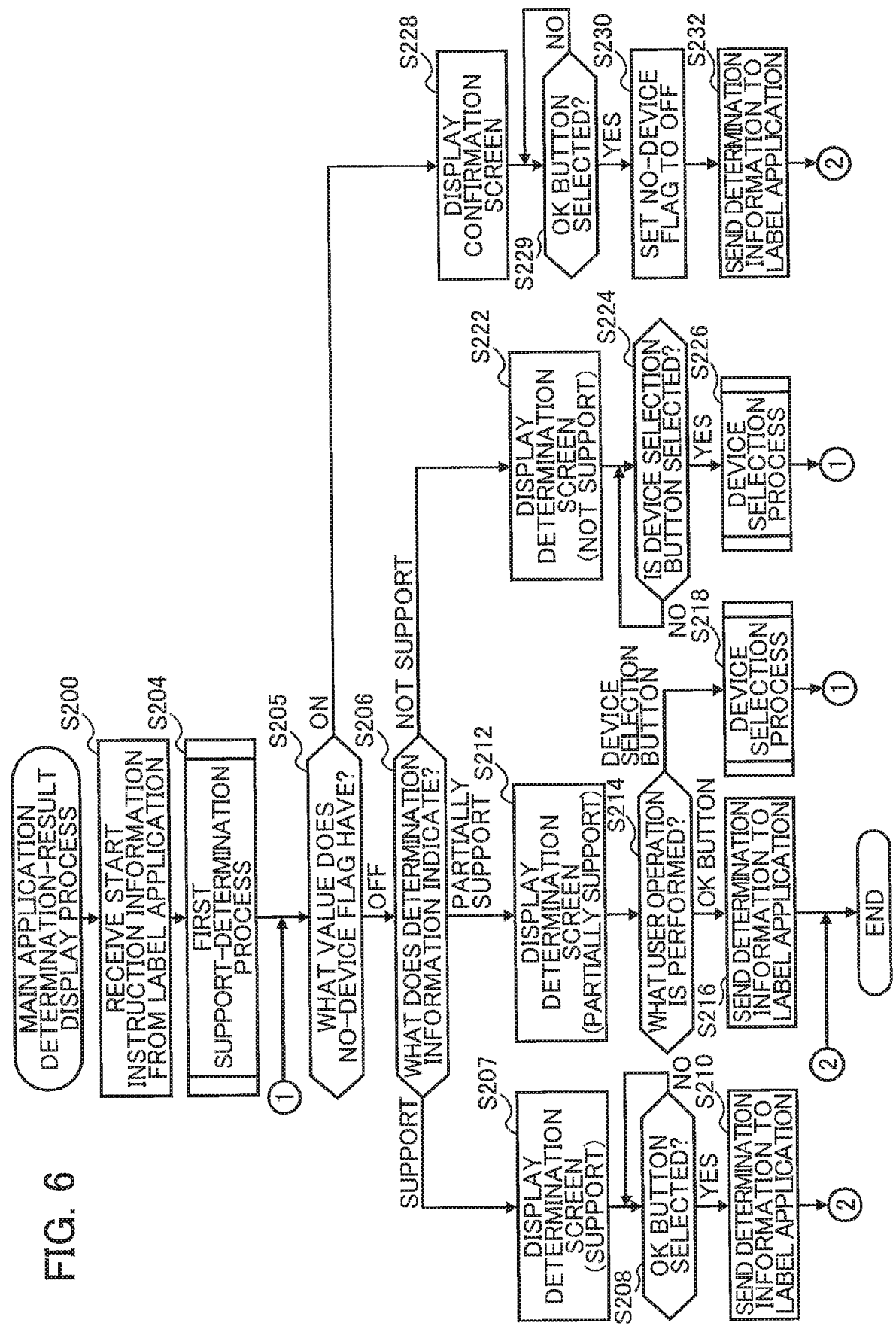
FIG. 6 is a flowchart illustrating a determination-result display process according to the embodiment.

In S200 of FIG. 6, the CPU 12 receives the start instruction information from the label application 17 via the share function of the OS 20.

In S204, the CPU 12 executes a first support-determination process which determines whether the specified apparatus supports the label application 17, and proceeds to S205. With the execution of the first support-determination process, determination information associated with the specified apparatus is created. The determination information indicates whether the specified apparatus supports the label application 17. Specifically, the determination information indicates one of "support", "partially support", and "not support". If the specified apparatus can execute both the basic operation and the optional operation, the CPU 12 creates the determination information indicating "support" associated with the specified apparatus. If the specified apparatus can execute the basic operation but cannot execute the optional operation, the CPU 12 creates the determination information indicating "partially support" associated with the specified apparatus. If the specified apparatus cannot execute the basic operation, the CPU 12 creates the determination information "not support" associated with the specified apparatus.

In S205, the CPU 12 determines whether the no-device flag is set to a second value "ON". The no-device flag is set to the second value "ON" when the CPU 12 determines in a device selection process (described later) that the information processing terminal 10 is not communicatively connected to the MFP 40 which is capable of executing the basic operation. By default, the no-device flag is set to the first value "OFF".

If the no-device flag is set to the first value "OFF" (S205: OFF), the CPU 12 proceeds to S206 to determine whether the determination information associated with the specified device information d indicates "support", "partially support", or "not support".

Figure 12A:
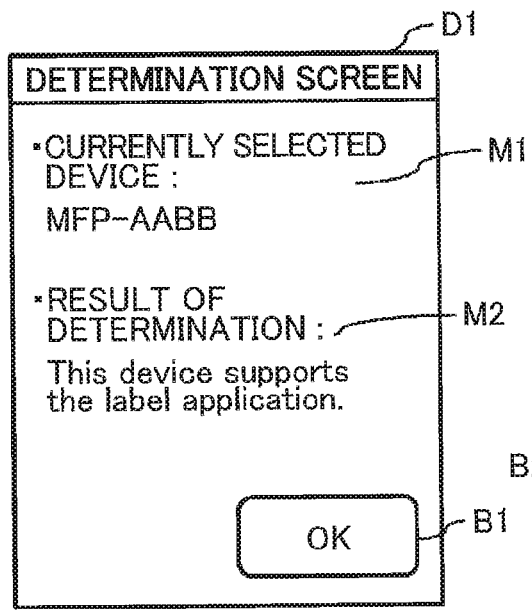
FIG. 12A is an explanatory diagram illustrating a determination screen in a case where determination information indicates "support"

If the CPU 12 determines that the determination information associated with the specified device information d indicates "support" (S206: support), in S207 the CPU 12 controls the display 30 to display a determination screen D1 illustrated in FIG. 12A. FIG. 12A illustrates the determination screen D1 in a case where the MFP 40A is specified as the specified apparatus. In this case, the determination screen D1 includes messages M1, M2 and an OK button B1. The message M1 indicates a device ID (MFP-AABB) in the device information d1 of the MFP 40A, and the message M2 indicates the determination information, that is, the specified device supports the label application 17. The OK button B1 is for prompting the main application 16 to send the determination information to the label application 17.

In S208, the CPU 12 waits until accepting a user operation to select an OK button B1 of the determination screen D1 via the operation interface 28 (S208: No). If the CPU 12 accepts the user operation to select the OK button B1 via the operation interface 28 (S208: Yes), in S210 the CPU 12 sends the determination information to the label application 17 via a share function of the OS 20. More specifically, the main application 16 executes an Intent API provided by the OS 20 while specifying a URI scheme as an argument. Here, the URI scheme includes a package name, activity information, and the determination information. The package name is for identifying the label application 17. The activity information instructs the label application 17 to execute a main process (described later). Then, the CPU 12 ends the determination-result display process.

Figure 12B:
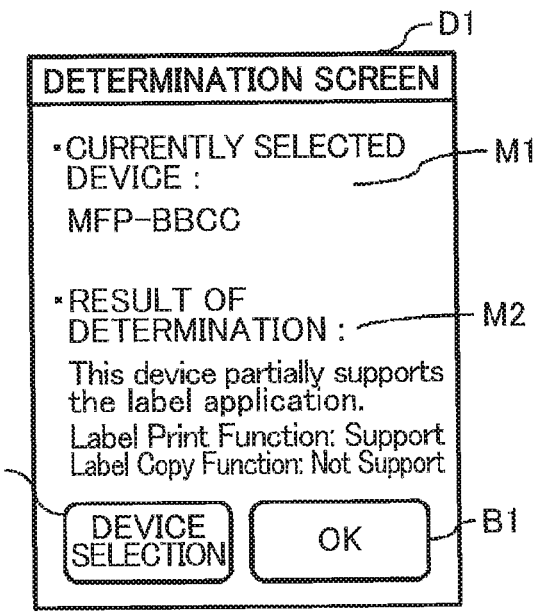
FIG. 12B is an explanatory diagram illustrating a determination screen in a case where determination information indicates "partially support"

If the CPU 12 determines that the determination information associated with the specified device information d indicates "partially support" (S206: partially support), in S212 the CPU 12 controls the display 30 to display a determination screen D1 shown in FIG. 12B. FIG. 12B illustrates the determination screen D1 in a case where the MFP 40B is specified as the specified apparatus. In this case, the determination screen D1 includes the message M1, the message M2, the OK button B1, and a device selection button B2. The message M1 indicates a device ID (MFP-BBCC) in the device information d2 of the MFP 40B. The message M2 indicates the determination information, that is, the specified device partially supports the label application 17. If the determination information indicates "partially support", the message M2 may include information on a function of the label application 17 (e.g. a function name, or an image indicating the function) which the specified apparatus supports.

In S214, the CPU 12 accepts a user operation to select a button of the determination screen D1 via the operation interface 28. If the CPU 12 accepts a user operation to select the OK button B1 via the operation interface 28 (S214: OK button), in S216 the CPU 12 executes the same process as that of S210 and ends the determination-result display process. On the other hand, if the CPU 12 accepts a user operation to select the device selection button B2 via the operation interface 28 (S214: device selection button), the CPU 12 executes a device selection process (described later) of S218 and returns to S205.

Figure 12C:
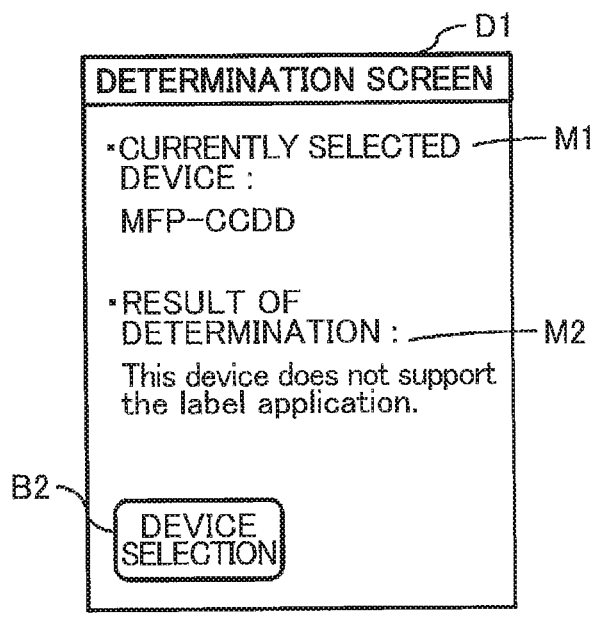
FIG. 12C is an explanatory diagram illustrating a determination screen in a case where determination information indicates "not support"

If the CPU 12 determines that the determination information associated with the specified device information d indicates "not support" (S206: not support), in S222 the CPU 12 controls the display 30 to display a determination screen D1 illustrated in FIG. 12C. FIG. 12C illustrates the determination screen D1 in a case where the MFP 40C is specified as the specified apparatus. In this case, the determination screen D1 includes the message M1, the message M2, and the device selection button B2. The message M1 indicates a device ID (MFP-CCDD) of the device information d3 of the MFP 40C. The message M2 indicates the determination information, that is, the specified device does not support the label application 17.

In S224, the CPU 12 waits until accepting a user operation to select the device selection button B2 of the determination screen D1 via the operation interface 28 (S224: No). If the CPU 12 accepts the user operation to select the device selection button B2 via the operation interface 28 (S224: Yes), the CPU 12 executes the device selection process (described later) and returns to S205.

Figure 12D:
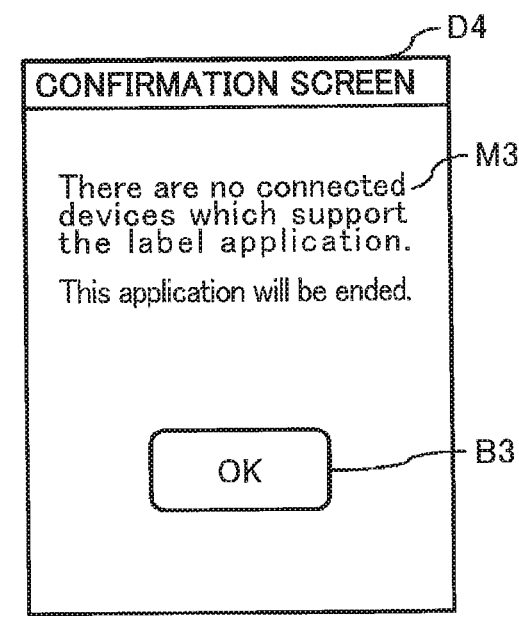
FIG. 12D is an explanatory diagram illustrating a confirmation screen.

If the no-device flag is set to the second value "ON" (S205: ON), in S228 the CPU 12 displays the display 30 to display a confirmation screen D4 illustrated in FIG. 12D. The confirmation screen D4 includes a message M3, and an OK button B3. The message M3 indicates that no devices support the label application 17, that is, no device supporting the label application 17 is connected with the information processing terminal 10. The OK button B3 is for prompting the main application 16 to transmit the determination information to the label application 17.

In S229, the CPU 12 waits until accepting a user operation to select the OK button B3 of the confirmation screen D4 via the operation interface 28 (S229: No). If the CPU 12 accepts the user operation to select the OK button B3 via the operation interface 28 (S229: Yes), in S230 the CPU 12 sets the no-device flag to the first value "OFF", in S232 executes the same process as that of S210 or S216, and ends the determination-result display process.

Device Selection Process

Figure 7:
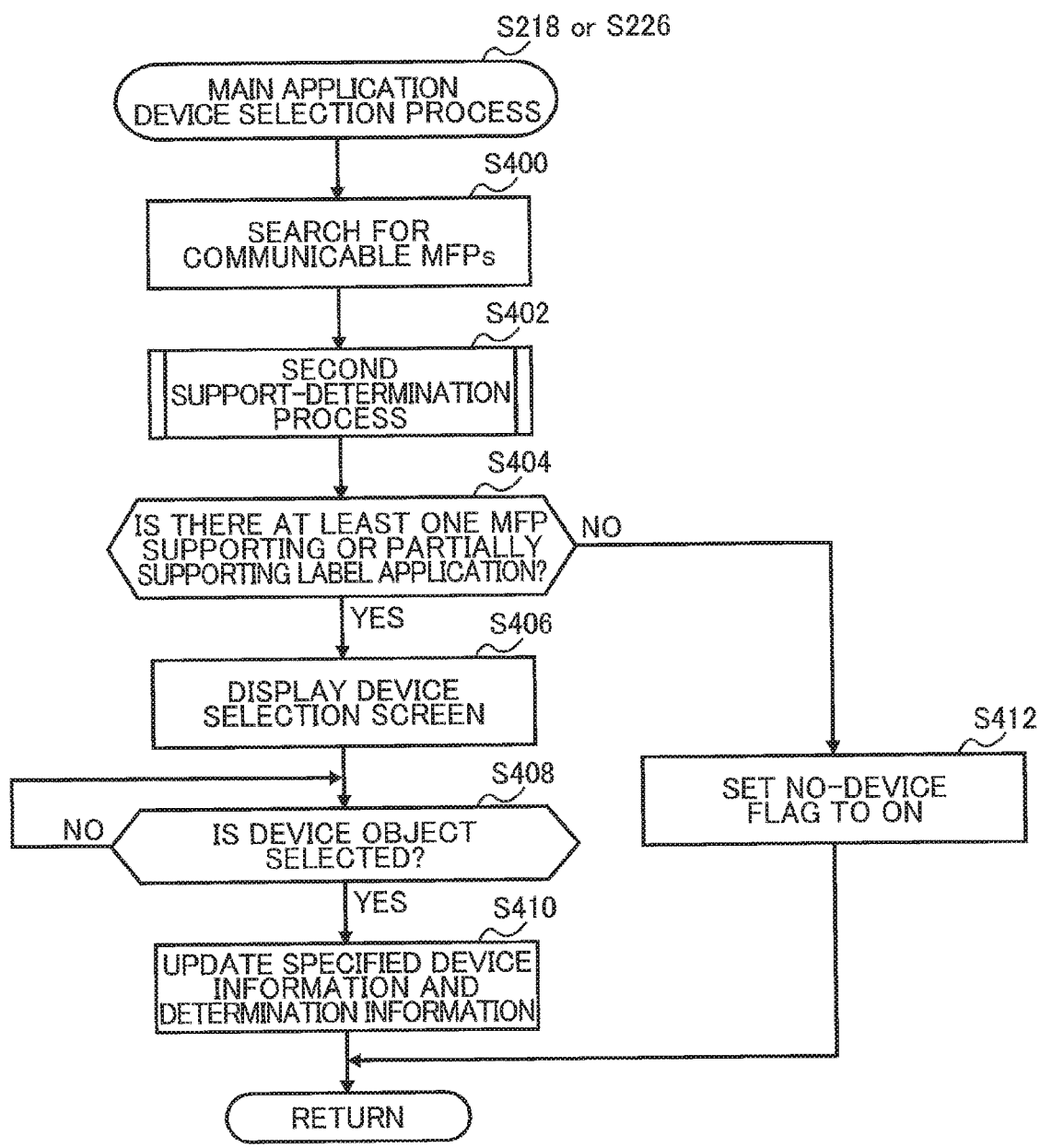
FIG. 7 is a flowchart illustrating a device selection process according to the embodiment.

FIG. 7 is a flowchart illustrating the device selection process (S218 or S226) in detail.

In S400, the CPU 12 executing the main application 16 searches for a plurality of MFPs 40 with which the information processing terminal 10 can communicate via the communication IF 26. Specifically, the CPU 12 uses the simple network management protocol (SNMP), and broadcasts transmission request information to the communication network 101 via the communication IF 26. As a response to the transmission request information, the CPU 12 receives via the communication IF 26 device information d sent by the MFPs 40. The CPU 12 identifies the MFP 40A, the MFP 40B, and the MFP 40C, as the MFPs 40 with which the information processing terminal 10 can communicate. The method to search for MFPs 40 with which the information processing terminal 10 can communicate may be another known method.

In S402, the CPU 12 executes a second support-determination process which determines whether the plurality of MFPs 40 identified in S400 supports the label application 17 based on the respective device information d received in S400. The CPU 12 creates determination information indicating whether the label application 17 is supported, is partially supported, or not supported, for each of the MFPs 40 identified in S400 through execution of the second determination process. The CPU 12 stores each determination information, associated with the device information d of each MFP 40 received in S400. Here, the CPU 12 may execute S400 and S402 in parallel. More specifically, every time the CPU 12 receives device information d in S400, the CPU 12 may execute the second support-determination process which determines whether the MFP 40 having sent the device information d supports the label application 17 so that the searching process is executed in parallel with the second support-determination process.

In S404, the CPU 12 determines whether at least one of the pieces of determination information created in S402 indicates "support" or "partially support".

Figure 13A:
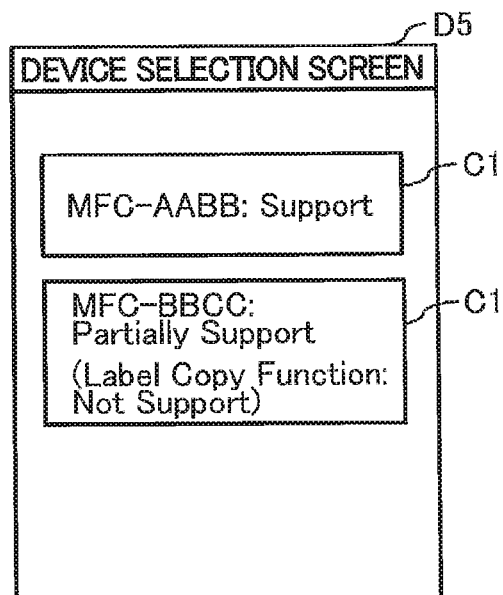
FIG. 13A is an explanatory diagram illustrating a device selection screen.

If the CPU 12 makes YES determination (S404: Yes), in S406 the CPU 12 controls the display 30 to display a device selection screen D5 illustrated in FIG. 13A. The device selection screen D5 includes device objects C1. The objects C1 are displayed in a selectable manner by the user. The device objects C1 correspond to a plurality of MFPs 40 (MFP 40A, MFP 40B) which is identified in S402 as MFPs 40 capable of executing the basic operation. A display area of each of the device objects C1 may include the device ID of the MFP 40 and determination information indicating whether the MFP 40 supports or partially supports the label application 17. If the determination information indicates "partially support" for an MFP 40, the display area of the device object C1 corresponding to the MFP 40 may include information indicating a function that the MFP 40 cannot execute among functions included in the label application 17. Here, the information may be the name of the function that the MFP 40 cannot execute, or an image indicating the function that the MFP 40 cannot execute. In addition, if an MFP 40 does not support the label application 17, a device object C1 corresponding to the MFP 40 may be displayed in such a manner that the device object cannot be selected, or may not be displayed on the device selection screen D5. Furthermore, if an MFP 40 is capable of executing an image processing operation which the specified apparatus cannot execute, the device object C1 corresponding to the MFP 4 may be highlighted. Specifically, the device object C1 may be upsized, or the frame border of the device object C1 may be made thicker. FIG. 13A illustrates one example of the device selection screen D5 in a case where the MFP 40B has been selected as the specified apparatus. In this case, because the MFP 40A is capable of executing the disc label scan operation which the MFP 40B is incapable of executing, the device object C1 corresponding to the MFP 40A is highlighted.

In S408, the CPU 12 waits until accepting a user operation to select the device object C1 of the device selection screen D5 via the operation interface 28 (S408: No). If the CPU 12 accepts the user operation to select the device object C1 via the operation interface 28 (S408: YES), in S410 the CPU 12 updates the specified device information d stored in the memory 14 and the determination information associated with the specified device information d, to the device information d of the MFP 40 corresponding to the device object C1 on which the user operation has been executed, and the determination information associated with this device information d. Accordingly, the CPU 12 ends the device selection process.

If the CPU 12 determines in S404 that each determination information indicates neither "support" nor "partially support" (S404: No), in S412 the CPU 12 sets the no-device flag to the second value "ON" (S412) and ends the device selection process.

First Support-Determination Process

Figure 8:
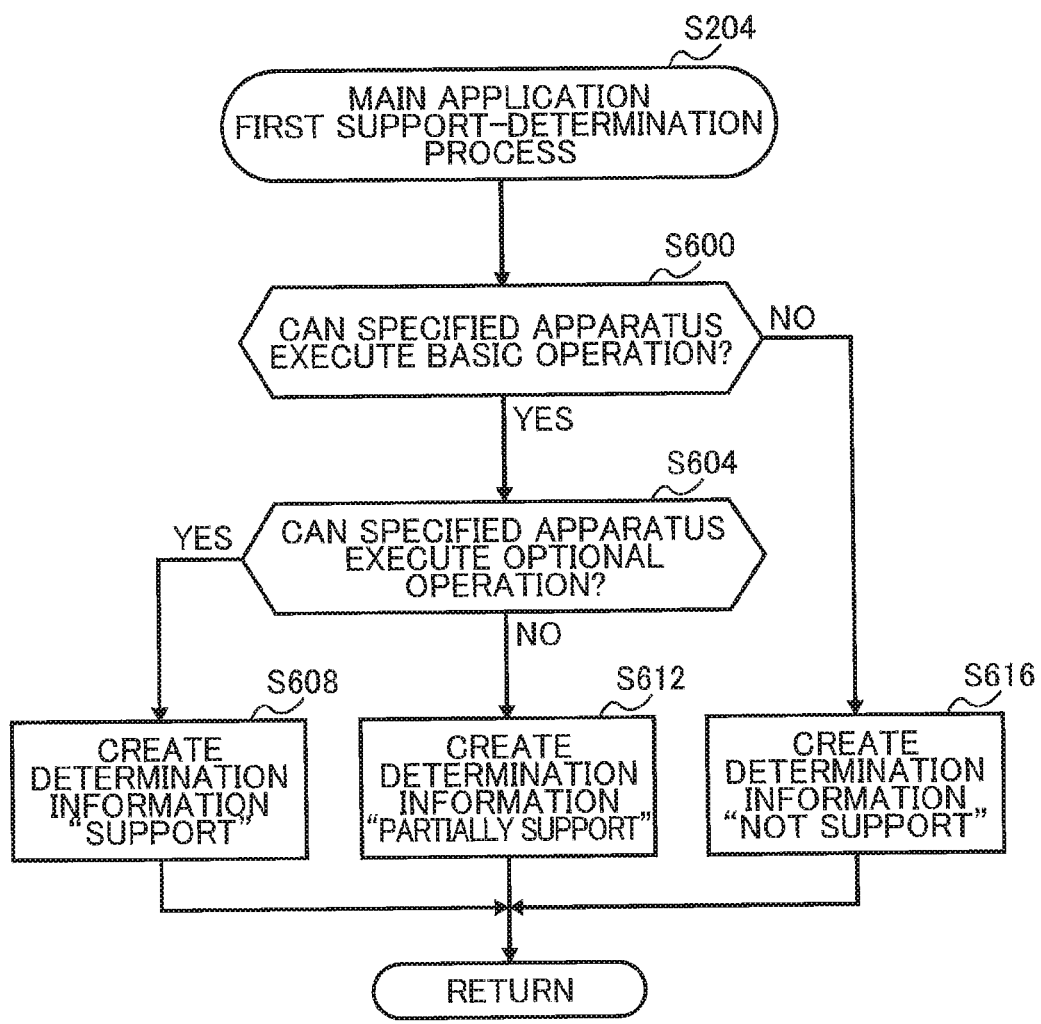
FIG. 8 is a flowchart illustrating a first support-determination process according to the embodiment.

FIG. 8 is a flowchart illustrating the first support-determination process.

In S600, the CPU 12 determines whether the specified apparatus can execute the basic operation. More specifically, the CPU 12 determines that the disc label print operation is the basic operation by using the operation ID and the operation information which are included in the operation list 18 received in S200. If the CPU 12 determines that the capability information of the device information d on the specified apparatus includes information to indicate that the specified apparatus supports the print operation, and information to indicate that the specified apparatus supports the sheet size of a disc label, the CPU 12 determines that the specified apparatus can execute the disc label print operation.

If the CPU 12 determines that the specified apparatus can execute the basic operation (S600: Yes), in S604 the CPU 12 determines whether the specified apparatus can execute the optional operation. More specifically, the CPU 12 first determines that the disc label scan operation is the optional operation by using the operation ID and the operation information which are included in the operation list 18 received in S200. Then, if the CPU 12 determines that the capability information of the device information d on the specified apparatus includes information to indicate that the specified apparatus supports the scan operation, and information to indicate that the specified apparatus supports a color used for the disc label copy, the CPU 12 determines that the specified apparatus can execute the disc label scan operation. Here, the phrase "the specified apparatus supports a color used for the disc label copy" means that the specified apparatus can execute a color conversion on the scan data to be suitable to print an image on the surface of a disc.

If the CPU 12 determines that the specified apparatus can execute the optional operation (S604: Yes), in S608 the CPU 12 creates the determination information "support", and stores the determination information associated with the specified device information d in the memory 14. Accordingly, the CPU 12 ends the first support-determination process.

If the CPU 12 determines that the specified apparatus cannot execute the optional operation (S604: No), in S612 the CPU 12 creates the determination information "partially support", and stores the determination information associated with the specified device information d in the memory 14. Then, the CPU 12 ends the first support-determination process. Here, the determination information includes information to indicate an optional operation which the specified apparatus cannot execute. If the operation list 18 includes a plurality of optional operations, the determination information may include information to indicate each optional operation which the specified apparatus can execute.

If the CPU 12 determines that the specified apparatus cannot execute the basic operation (S600: No), in S616 the CPU 12 creates the determination information "not support" without executing S604, and stores the determination information associated with the specified device information d in the memory 14. Subsequently, the CPU 12 ends the first support-determination process.

With the above-described processes, the CPU 12 determines whether the specified apparatus supports, partially supports, or does not support the label application 17.

Second Support-Determination Process

Figure 9:
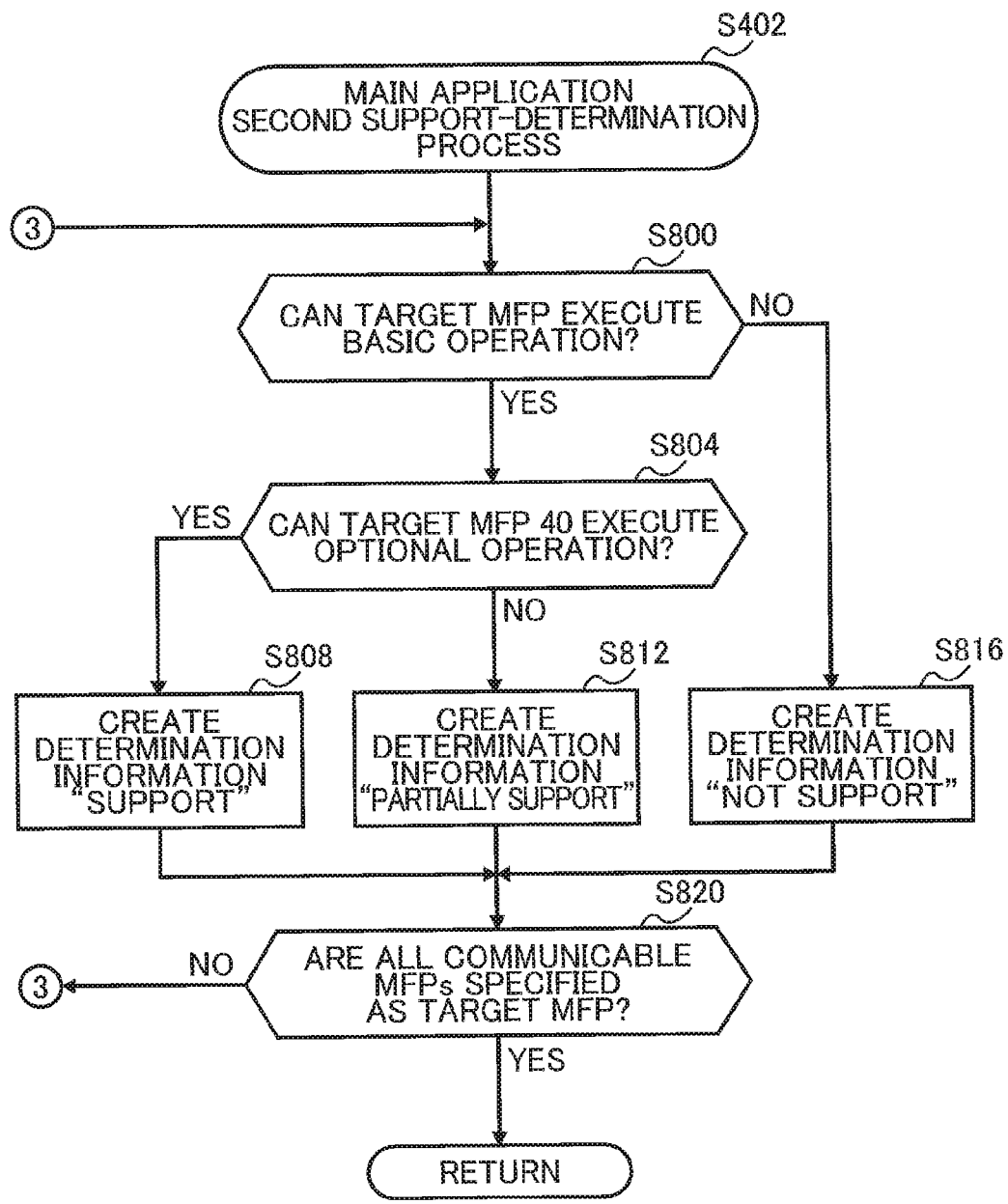
FIG. 9 is a flowchart illustrating a second support-determination process according to the embodiment.

FIG. 9 is a flowchart illustrating the second support-determination process (S402) in detail.

In S800, the CPU 12 specifies a target MFP 40 among the plurality of MFPs 40 identified in S400, and determines whether the target MFP 40 can execute the basic operation, on the basis of the corresponding device information d received in S400. If the CPU 12 determines that the target MFP 40 can execute the basic operation (S800: Yes), in S804 the CPU 12 determines whether the target MFP 40 can execute the optional operation, on the basis of the corresponding device information d received in S400.

If the CPU 12 determines that the target MFP 40 can execute the optional operation (S804: Yes), in S808 the CPU 12 creates the determination information "support", and stores the determination information associated with the device information d of the target MFP 40 in the memory 14. Subsequently, the CPU 12 proceeds to S820.

If the CPU 12 determines that the target MFP 40 cannot execute the optional operation (S804: No), in S812 the CPU 12 creates the determination information "partially support", and stores the determination information associated with the device information d of the target MFP 40 in the memory 14. Subsequently, the CPU 12 proceeds to S820. In this procedure, the determination information includes information indicating an optional operation which the target MFP 40 cannot execute. If the operation list 18 includes a plurality of optional operations, the determination information may include information indicating an optional operation which the target MFP 40 can execute, instead of the information indicating the optional operation which the target MFP 40 cannot execute.

If the CPU 12 makes NO determination (S800: No), in S816 the CPU 12 creates the determination information "not support", and stores the determination information associated with the device information d of the target MFP 40 in the memory 14. Subsequently, the CPU 12 proceeds to S820. Through the steps S800-S816, the CPU 12 determines whether the target MFP 40 supports, partially supports, or does not support the label application 17.

In S820, the CPU 12 determines whether all the MFPs 40 are specified as the target MFP 40 among the MFPs 40 with which the information processing terminal 10 can communicates. Specifically, the CPU 12 determines whether a determination information is associated with a device information d, for a device information d of each MFP 40 among the MFPs 40 with which the information processing terminal 10 can communicates.

If the CPU 12 makes NO determination (S820: No), the CPU 12 returns to S800 and specifies a new target MFP 40 among the MFPs 40 which are not yet specifies as the target MFP 40, and determines whether the new target MFP 40 can executes the basic operation. On the other hand, if the CPU 12 makes YES determination (S820: Yes), the CPU 12 ends the second support-determination process.

Main Process

After S210 or S216 of FIG. 6, the CPU 12 executing the OS 20 executes, in the foreground, the label application 17 identified by using the package name in the determination information (or the URI scheme). The CPU 12 executes the main process (FIG. 10) indicated by the activity information in the determination information (or the URI scheme), by executing the label application 17.

In S1000, the CPU 12 receives the determination information from the main application 16 via the share function of the OS 20, and in S1002 determines whether the determination information received in S1000 indicates "support", "partially support", or "not support".

If the CPU 12 determines that the determination information received in S1000 indicates "not support" (S1002: not support), in S1003 the CPU 12 controls the display 30 to display an error screen (not illustrated) indicating that no devices support the label application 17. The error screen includes a message indicating that no devices support the label application 17. Then the CPU 12 ends the main process.

Figure 13B:
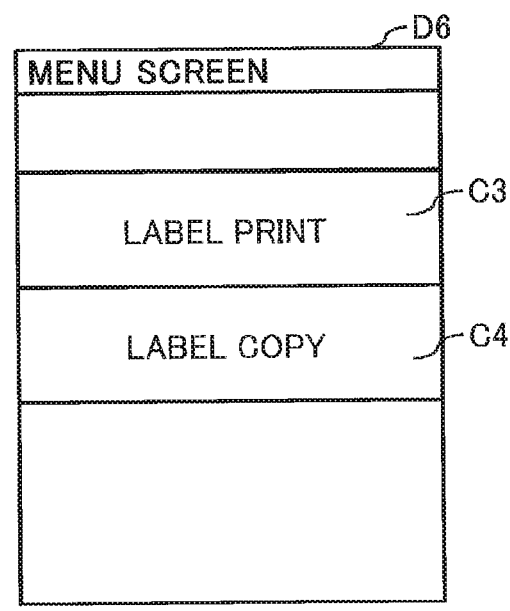
FIG. 13B is an explanatory diagram illustrating a menu screen.

If the CPU 12 determines that the determination information received in S1000 indicates "support" (S1002: support), in S1004 the CPU 12 controls the display 30 to display a menu screen D6 illustrated in FIG. 13B. The menu screen D6 includes function objects C3 and C4 in a manner that all the functions are selectable. The function object C3 corresponds to the disc label print function of the label application 17. The function object C4 corresponds to the disc label copy function of the label application 17.

If the CPU 12 determines that the determination information received in S1000 indicates "partially support" (S1002: partially support), in S1006 the CPU 12 controls the display 30 to display the menu screen D6 illustrated in FIG. 13B in a manner the supported function(s) is (are) selectable. The CPU 12 may control the display 30 to display the function object C3 and a function object C4 in the menu screen D6 on the basis of information in the determination information. Here, the function object C3 corresponds to the function which the specified apparatus can execute. The function object C3 may be displayed in a selectable manner by the user. Note, the determination information includes information indicating a function which the specified apparatus cannot execute. The displayed function object C4 is based on this information and thus corresponds to the function including the optional operation which the specified apparatus cannot execute. The function object C4 may be displayed in a unselectable manner by the user.

In S1008 the CPU 12 determines whether a user operation to select the function object C3 is accepted via the operation interface 28. Here, the function object C3 is displayed in a selectable manner and corresponds to the disc label print function. If the CPU 12 accepts the user operation to select the function object C3 (S1008: disc label print), in S1010 the CPU 12 controls the display 30 to display a disc label edit screen D7 illustrated in FIG. 13C. The disc label edit screen D7 includes a disc label image C5, edit buttons B4, B5, and B6, and a print button B7. The label application 17 accepts user operations (editing operations of the disc label image C5) performed on the disc label edit screen D7 via the operation interface 28, and waits until accepting a user operation to select the print button B7 via the operation interface 28 (S1012: No).

The disc label image C5 is an image edited by using the edit buttons B4 to B6. The edit button B4 corresponds to an instruction to add a character string to the disc label image C5. The edit button B5 corresponds to an instruction to add a color to the disc label image C5. The edit button B6 corresponds to an instruction to add a picture to the disc label image C5. The print button B7 corresponds to an instruction to execute the disc label print operation.

The CPU 12 edits the disc label image C5 in accordance with user operations executed on the edit buttons B4 to B6. The CPU 12 stores disc label image data representing an edited disc label image C5 in the memory 14. That is, the CPU 12 receives the execution conditions for the disc label print operation specified by the user. The execution conditions for the disc label print operation may include image data which is target data of the disc label print operation, image quality (e.g. fine or normal) in which the disc label print operation is executed, and color (e.g. color or monochrome) of an image to be printed on a disc.

If the CPU 12 accepts a user operation to select the print button B7 via the operation interface 28 (S1012: Yes), S1014 the CPU 12 sends a disc label print instruction information to the main application 16. The disc label print instruction information instructs the specified apparatus to execute the disc label print operation. More specifically, the label application 17 executes an Intent API provided by the OS 20 while specifying a URI scheme as an argument. Here, the URI scheme includes a package name, activity information, an operation ID "disc label print", the disc label image data, and the execution condition information. The package name is for identifying the main application 16. The activity information instructs the main application 16 to execute a print process ("disc label print" described later). The execution condition information defines the execution conditions for the disc label print operation. In other words, the disc label print instruction information includes the execution conditions for the disc label print operation. Then the CPU 12 ends the main process.

On the other hand, if the CPU 12 accepts a user operation to select the function object C4 which is displayed in a selectable manner and corresponds to the disc label copy function (S1008: disc label copy), in S1016 the CPU 12 sends a disc label read instruction information to the main application 16. The disc label read instruction information instructs the specified apparatus to execute the disc label scan operation. More specifically, the label application 17 executes an Intent API provided by the OS 20 while specifying a URI scheme as an argument. Here, the URI scheme includes an operation ID "disc label scan".

In S1018 the CPU 12 receives scan data created by the specified apparatus via the main application 16.

Figure 13C:
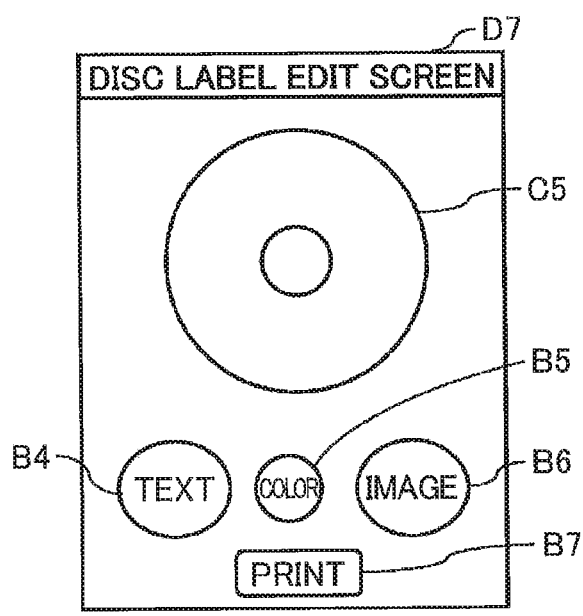
FIG. 13C is an explanatory diagram illustrating a disc label edit screen.

In S1020 the CPU 12 controls the display 30 to display the disc label edit screen illustrated in FIG. 13C. In this operation, the CPU 12 may control the display 30 to display the disc label edit screen including a scan image represented by the scan data received in S1018. The CPU 12 executes S1022 the same as S1012, executes S1024 the same as S1014, and ends the main process. Here, instead of executing steps S1020 to S1024, the CPU 12 may store in the memory 14 the scan data received in S1018.

Print Process

Figure 10:
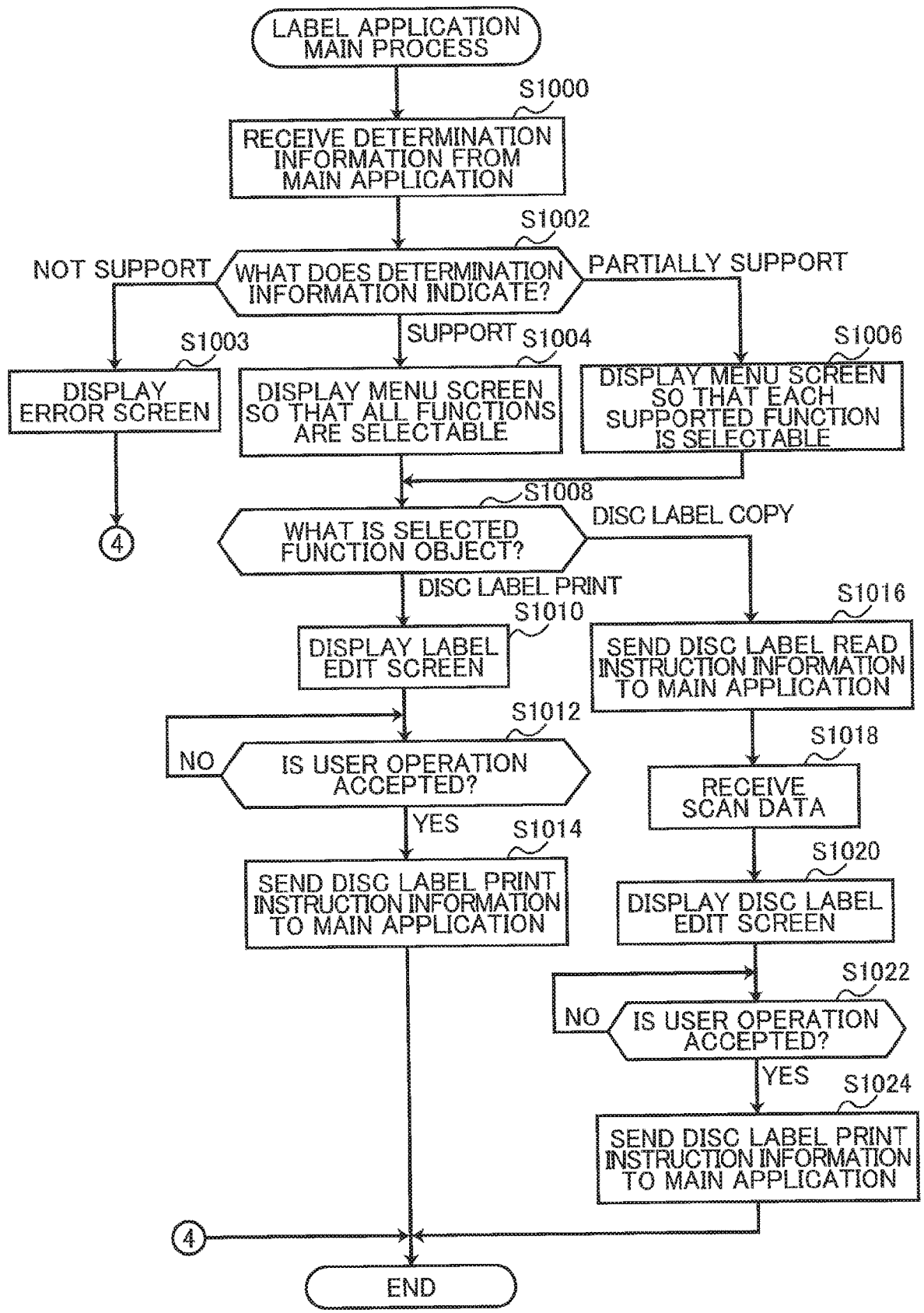
FIG. 10 is a flowchart illustrating a main process according to the embodiment.
Figure 11:
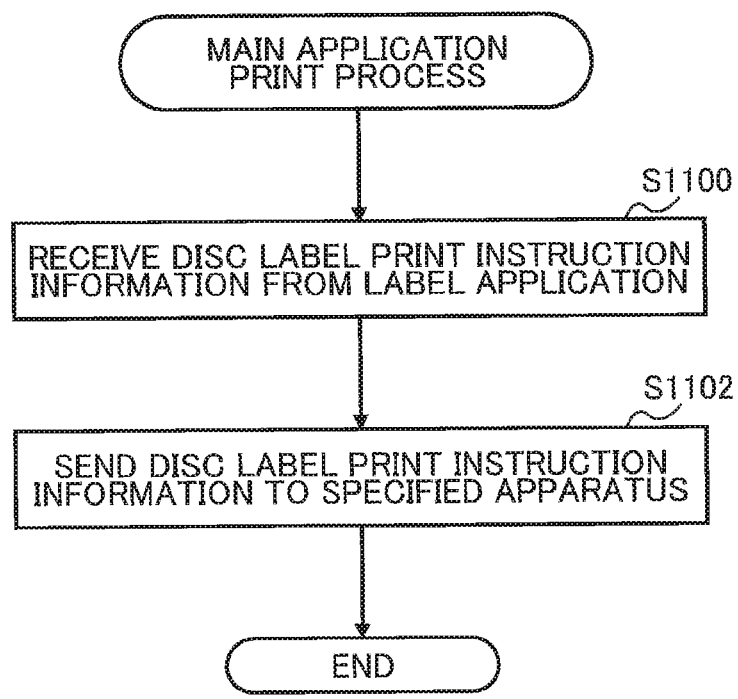
FIG. 11 is a flowchart illustrating a print process according to the embodiment.

After S1014 or S1024 show in FIG. 10, the CPU 12 executing the OS 20 executes, in the foreground, the main application 16 identified by using the package name included in the disc label print instruction information (or the URI scheme). The CPU 12 executes a print process (FIG. 11) indicated by the activity information included in the disc label print instruction information (or the URI scheme), by executing the main application 16.

In S1100, the CPU 12 receives the URI scheme (the disc label print instruction information) including the operation ID "disc label print", the disc label image data, and the execution condition from the label application 17 via the share function of the OS 20.

In S1102, the CPU 12 sends a disc label print instruction information to the specified apparatus via the communication IF 26, and ends the print process. After that, although not illustrated, the control program 35 of the MFP 40 receives the disc label print instruction information from the information processing terminal 10 via the wireless communication IF 31, and controls the printer 29 to execute a disc label print operation according to the disc label print instruction information.

Effects by the Present Embodiment

As described above, the CPU 12 executing the main application 16 receives the operation ID indicating an image processing operation (S200). Here, the label application 17 can instructs the specified apparatus via the main application 16 to execute the image processing operation. The CPU 12 determines whether the specified apparatus can execute the image processing operation indicated by the received operation ID (S204). The CPU 12 controls the display 30 to display the determination screen D1 including the determination information indicating a result of the determination (S207, S212, and S222). The CPU 12 receives the disc label print instruction information from the label application 17 (S1100). Here, the disc label print instruction information is for executing the image processing operation which the CPU 12 has determined that the specified apparatus can execute. The CPU 12 sends the disc label print instruction information to the specified apparatus. Thus, a user can recognize that the specified apparatus can execute the image processing operation which can be indicated by the label application 17. On the basis of this recognition, the user can perform a user operation to select the image processing operation in the label application 17 (S1008, S1012, and S1022). The above described configuration can prevent the user operation to select the image processing operation in the label application 17 from becoming useless.

If the CPU 12 executing the main application 16 determines that the specified apparatus cannot execute an image processing operation indicated by the operation ID (S206: not support), the CPU 12 executes the device selection process (S226). The CPU 12 executing the device selection process performs the following processing. That is, the CPU 12 determines whether an MFP 40 can execute the image processing operation indicated by the operation ID, for each of the plurality of MFPs 40 which is identified to be capable of communicating with the information processing terminal 10 (S402). The CPU 12 controls the display 30 to display the device selection screen D5 (S406). The device selection screen D5 (FIG. 13A) includes the device objects C1 of the MFPs 40 determined to be capable of executing the image processing operation. When accepting a user operation to select a device object C1 via the operation interface 28 (S408), the CPU 12 updates the specified device information d stored in the memory 14 to the device information d of the MFP 40 corresponding to the device object C1 on which the user operation has been executed (S410). Thus, even when the specified apparatus cannot execute an image processing operation indicated by the operation ID, a user can easily select an MFP 40 capable of executing the image processing operation indicated by the operation ID, as a specified apparatus, before executing a user operation to select the image processing operation in the label application 17.

If the determination information indicates that the specified apparatus partially supports the label application 17 (S206: partially support), the CPU 12 executing the main application 16 controls the display 30 to display the determination screen D1 shown in FIG. 12B (S212). The determination screen D1 includes the device selection button B2 and the OK button B1. The device selection button B2 is for instructing the main application 16 to execute the device selection process. The OK button B1 is for instructing the main application 16 to send the determination information to the label application 17 in S216. If the CPU 12 accepts a user operation to select the OK button B1 via the operation interface 28 (S214: OK), the CPU 12 sends the determination information to the label application 17. When the specified apparatus is an MFP 40 supporting some of the image processing operations, which the label application 17 can instruct to execute, there are two possibilities. In one possibility, the user remains to select the specified apparatus, and desires to select an image processing operation which the specified apparatus can execute. In the other possibility, the user desires to select another MFP 40 which can execute an image processing operation which the specified apparatus cannot execute. With the above-described configuration, since the CPU 12 executing the main application 16 can support both of the above described possibilities, improving the user friendliness.

If the CPU 12 executing the main application 16 determines that the specified apparatus cannot execute an image processing operation indicated as the basic operation by the operation list 18 (S600: No), the CPU 12 controls the display 30 to display the determination screen D1 shown in FIG. 12C (S222). Here, the determination screen D1 does not include the OK button B1, but includes the device selection button B2, even if the specified apparatus can execute an image processing operation indicated as the optional operation by the operation list 18. Thus, when the specified apparatus cannot execute the basic operation, the user can be prevented from executing a user operation to specify an image processing operation in the label application 17.

The CPU 12 executing the main application 16 determines whether the specified apparatus can execute an image processing operation indicated as the basic operation by the operation list 18 (S600). Subsequently, the CPU 12 determines whether the specified apparatus can execute an image processing operation indicated as the optional operation by the operation list 18 (S604). The CPU 12 then controls the display 30 to display the determination screen D1 (S207, S212, and S222). The determination screen D1 includes the determination information indicating a result of the determination. Accordingly, the CPU 12 executing the main application 16 can quickly notify a user of the result of the determination.

The CPU 12 executing the main application 16 controls the display 30 to display the device selection screen D5 shown in FIG. 13A (S406). The device selection screen D5 includes the device objects C1 corresponding to MFPs 40 which can execute the basic operation. Thus, a user can be prevented from mistakenly selecting a device which cannot execute the basic operation.

In the device selection screen D5, the CPU 12 executing the main application 16 controls the display 30 to highlight a device object C1 corresponding to an MFP 40 which can execute an image processing operation which the specified apparatus cannot execute (S406). If a user instructs the CPU 12 to execute the device selection process, the user probably desires to select an MFP 40, as a new specified apparatus, which can execute the image processing operation that the present specified apparatus cannot execute. Thus, with the above-described configuration, the user can easily find a user-desired new specified apparatus.

Modifications

In the above-described embodiment, after the label application 17 is started, the CPU 12 controls the display 30 to display the start screen (S100), and sends the start instruction information to the main application (S102). However, after the label application 17 is started, the CPU 12 executing the label application 17 may control the display 30 to display a menu screen without displaying the start screen including a device check button. When accepting a user operation to select the device check button via the operation interface 28, the CPU 12 may send the start instruction information to the main application 16.

In the above-described embodiment, the operation list 18 includes the operation IDs and the operation information. However, the operation list 18 may include an operation ID of at least one of image processing operations which the label application 17 can instruct to execute via the main application 16. In this case, in the first support-determination process of FIGS. 8, S600 and S604 may be executed at one time. That is, in a single process, the CPU 12 may determine for each image processing operation indicated by the operation ID in the operation list 18 whether the specified apparatus can execute the image processing operation. In this process, if the specified apparatus can execute some of image processing operations identified by the operation IDs, the CPU 12 may create the determination information indicating "partially support". The same holds true in S800 and S804 of the second support-determination process of FIG. 9.

In the above-described embodiment, the determination screen D1 illustrated in FIGS. 12A to 12C includes the messages M1 and M2. However, the determination screen D1 may include at least the message M2.

In the above-described embodiment, the basic operation is an image processing operation required to use all the functions of the label application 17. However, the basic operation may be a certain image processing operation predefined by a vendor of the label application 17.

In the above-described embodiment, the device selection screen D5 illustrated in FIG. 13A includes the selectable device objects C1 corresponding to respective ones of a plurality of MFPs 40 (MFP 40A and MFP 40B) identified to be capable of executing the basic operation in S402. The device selection screen D5 may include all the device objects C1 corresponding to the MFPs 40 identified to be capable of communicating with the information processing terminal 10 in S400. In this case, if a device object C1 corresponding to the MFP 40 identified to be incapable of executing the basic object in S420 among the displayed device objects C1, the device object C1 may be displayed in an unselectable manner by the user.

In the above-described embodiment, in the first support-determination process of FIG. 8, if the CPU 12 determines that the specified apparatus does not support the basic operation (S600: No), the CPU 12 proceeds to S616, without determining whether the specified apparatus can execute the optional operation (S604). However, the CPU 12 may execute a step the same as S604 after NO determination is made in S600, and proceed to S616 if the specified apparatus does not support the basic operation. The same holds true in the series of processes S800, S804, and S816 of the second support-determination process shown in FIG. 9.

In the above-described embodiment, the processes of FIGS. 5 to 11 are executed by software (that is, by the main application 16 and the label application 17 stored in the memory 14). However, at least one of these processes may be executed by hardware, such as a logic circuit.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. A non-transitory computer-readable recording medium storing a main application for an information processing terminal having: a processor, and a memory storing capability information of a specified apparatus; a display; and a communication interface, wherein the information processing terminal has an operating system and a specific print application installed therein, the specified apparatus being an image processing apparatus specified by a user, wherein the operating system includes a share function to transmit and receive data between the main application and the specific print application, wherein the information processing terminal executing the specific print application instructs execution of an image processing operation, the main application comprising instructions for:

receiving identification information for identifying an image processing operation, which the specific print application is capable of instructing the specified apparatus to execute via the main application, among image processing operations;

determining by using the capability information stored in the memory whether the specified apparatus is capable of executing the identified image processing operation identified to be the image processing operation which the specific print application is capable of instructing the specified apparatus to execute via the main application;

displaying on the display determination information indicating a result of the determining;

receiving operation condition information via the share function from the specific print application in a case it is determined that the specified apparatus is capable of executing the image processing operation identified by the identification information, the operation condition information indicating a condition for executing the image processing operation identified by the identification information, the operation condition information received from the specific print application being transmitted by specifying the image processing operation by the user in the specific print application; and transmitting a command to the specified apparatus via the communication interface, the command instructing execution of the image processing operation under the condition indicated by the operation condition information.

2. The non-transitory computer-readable recording medium according to claim 1, wherein the image processing operation is related to a disc label, and the specific print application is a label print application instructing execution of the image processing operation related to the disc label.

3. The non-transitory computer-readable recording medium according to claim 1, wherein the image processing operation is related to one of: a label printing operation to print a label image on a disc; and a label scanning operation to scan an image to create scan data to be printed on a disc, wherein the specific print application is a label print application instructing execution of the image processing operation related to one of the label printing operation and the label scanning operation.

4. The non-transitory computer-readable recording medium according to claim 1, the identification information indicates a plurality of image processing operations which the specific print application is capable of instructing to execute to the main application, wherein the capability information is used to determine whether the specified apparatus is capable of executing an image processing operation, for each of the plurality of image processing operations identified by the identification information, wherein in a case where the specified apparatus is determined to be capable of executing at least one of the plurality of image processing operations, a first object and a second object together is displayed with the result of the determining, the first object being for instructing determining whether an image processing apparatus is capable of executing the image processing operation, for each of a plurality of image processing apparatuses communicable with the information processing terminal, the second object being for instructing transmitting the determination information to the specific print application via the share function, wherein the main application further comprises instructions for the transmitting the determination information to the specific print application via the share function in response to a specifying operation of the displayed second object by the user via the operation interface,
wherein after executing the transmitting, the receiving operation condition information is executed.

5. The non-transitory computer-readable recording medium according to claim 4, wherein the main application further comprises instructions for receiving operation information for classifying each of the plurality of image processing operations into one of a basic operation and an optional operation,
wherein the determining whether the specified apparatus is capable of executing the image processing operation identified by the identification information includes determining whether the specified apparatus is capable of executing an image processing operation classified as the basic operation and whether the specified apparatus is capable of executing an image processing operation classified as the optional operation,
wherein in a case where the specified apparatus is incapable of executing the image processing operation classified as the basic operation, the display displays the first object without displaying the second object.

6. The non-transitory computer-readable recording medium according to claim 5, wherein in a case where the specified apparatus is incapable of executing the image processing operation classified as the basic operation, it is determined that the specified apparatus is incapable of executing the image processing operation identified by the identification information without determining whether the specified apparatus is capable of executing an image processing operation classified as the optional operation.

7. An information processing terminal comprising:
a processor;
an operation interface; and
a memory storing capability information of a specified apparatus, the specified apparatus being an image processing apparatus specified by a user,
wherein a main application, a specific print application, and an operating system are installed in the information processing terminal, wherein the operating system includes a share function to transmit and receive data between the main application and the specific print application, wherein the information processing terminal executing the main application instructs execution of an image processing operation,
wherein the main application, when executed by the processor, causes the processor to perform:
receiving identification information for identifying an image processing operation, which the specific print application is capable of instructing the specified apparatus to execute via the main application, among image processing operations;
determining by using the capability information stored in the memory whether the specified apparatus is capable of executing the identified image processing operation identified to be the image processing operation which the specific print application is capable of instructing the specified apparatus to execute via the main application;
displaying on the display determination information indicating a result of the determining;
receiving operation condition information via the share function from the specific print application in a case where it is determined that the specified apparatus is capable of executing the image processing operation identified by the identification information, the operation condition information indicating a condition for executing the image processing operation identified by the identification information, the operation condition information received from the specific print application being transmitted by specifying the image processing operation by the user in the specific print application; and
transmitting a command to the specified apparatus via the communication interface, the command instructing execution of the image processing operation under the condition indicated by the operation condition information.

* * * * *